US009947337B1

(12) United States Patent
Wang et al.

(10) Patent No.: US 9,947,337 B1
(45) Date of Patent: Apr. 17, 2018

(54) ECHO CANCELLATION SYSTEM AND METHOD WITH REDUCED RESIDUAL ECHO

(71) Applicant: OmniVision Technologies, Inc., Santa Clara, CA (US)

(72) Inventors: Chung-An Wang, Singapore (SG); Dong Shi, Singapore (SG)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 15/464,887

(22) Filed: Mar. 21, 2017

(51) Int. Cl.
*H04B 3/20* (2006.01)
*G10L 21/0232* (2013.01)
(Continued)

(52) U.S. Cl.
CPC ........ *G10L 21/0232* (2013.01); *G10L 21/038* (2013.01); *H04R 3/04* (2013.01); *G10L 2021/02082* (2013.01)

(58) Field of Classification Search
CPC ....... G10L 2021/02082; G10L 21/0208; G10L 21/0232; G10L 2021/02166; G10L 21/02; G10L 2021/02163; G10L 2021/02165; G10L 21/0216; G10L 21/0205; G10L 21/0364; G10L 19/0204; G10L 2021/02161; G10L 25/18; G10L 25/84; G10L 21/028; G10L 21/0316; G10L 21/034; G10L 25/03; G10L 25/24; G10L 21/038; H04M 9/082; H04M 3/568; H04M 3/002; H04M 9/08; H04M 1/20; H04R 3/005; H04R 3/02; H04R 2499/11; H04R 1/406; H04R 3/04; H04R 2410/05; H04R 1/1083; H04R 2430/03; H04R 2201/107;
(Continued)

(56) References Cited

U.S. PATENT DOCUMENTS

| | | | | |
|---|---|---|---|---|
| 5,272,695 A * | 12/1993 | Makino ................. | H04M 9/082 370/291 |
| 2004/0018860 A1* | 1/2004 | Hoshuyama .......... | H04M 9/082 455/569.1 |
| 2010/0215185 A1* | 8/2010 | Christoph ............ | H04M 9/082 381/71.1 |

OTHER PUBLICATIONS

Malvar (1999) "A modulated complex lapped transform and its applications to audio processing," Acoustics, Speech, and Signal Processing, Proceedings, 1999 IEEE International Conference. vol. 3; 9 pages.

(Continued)

*Primary Examiner* — Norman Yu
(74) *Attorney, Agent, or Firm* — Lathrop Gage LLP

(57) ABSTRACT

An echo canceller includes a fast Fourier transform (FFT) unit to provide frequency domain representation (FD) of an input. A multiband adaptive filter receives the FD of the input and provides an FD filter output, the adaptive filter is a finite input response (FIR) digital filter. Another FFT unit provides an FD of a microphone signal, and a summer adds the FD filter output to the FD of the microphone signal to provide echo-canceller FD output. A feedback subsystem uses the echo-canceller FD output to adjust filter coefficients of at least a first, a second, and a third frequency band of the multiband adaptive filter to minimize uncancelled output in the echo-canceller FD output. The feedback subsystem adjusts the filter coefficients of the second frequency band of the adaptive filter according to uncancelled output in the first, second, and third frequency bands of the echo-canceller FD output.

12 Claims, 5 Drawing Sheets

(51) Int. Cl.
*G10L 21/038* (2013.01)
*H04R 3/04* (2006.01)
*G10K 11/16* (2006.01)
*H04B 15/00* (2006.01)
*G10L 21/0208* (2013.01)

(58) Field of Classification Search
CPC .......... H04R 2225/43; H04R 2227/001; H04R 2227/007; H04R 2227/009; G10K 11/16; G10K 11/1784; G10K 2210/505; G10K 11/175; G10K 2210/108
USPC ...... 381/66, 71.1, 71.11, 94.3, 107, 317, 56, 381/94.1, 97, 98; 704/226, 205, E21.002; 455/570; 379/388.07, 406.01, 406.08
See application file for complete search history.

(56) References Cited

OTHER PUBLICATIONS

Liu et al. (2000) “Simple design of oversampled uniform DFT filter banks with applications to subband acoustic echo cancellation,” Signal Processing. 80(5):831-847.

Least mean squares filter—Wikipedia; Accessed on the Internet Jan. 18, 2017 https://en.wikipedia.org/wiki/Least_mean_squares_filter; 7 pages.

* cited by examiner

ECHO CANCELLATION SYSTEM AND METHOD WITH REDUCED RESIDUAL ECHO

BACKGROUND

Echo recognition and cancellation systems are adapted for use to reduce acoustic echo in many communication applications. Almost any system having simultaneously-active microphones and speakers can benefit from echo cancellation, including intercoms, public address systems, musical recording and amplification systems, and speakerphones, including speaker modes in cell phones. Reducing noise by eliminating audio, and in some cases electronic, echo improves quality of audio detected by these microphones, prevents disturbing feedback oscillations, and improves intelligibility by those listening to detected audio.

Much noise in a microphone signal arises because the microphone picks up audio signals not just from a person speaking (or other sound source) near the microphone, but also from any transducer such as a loudspeaker that may be located near the microphone; the resulting microphone signal is a superposition of the loudspeaker signal as picked up at the microphone, and signals originating from the sound source. In systems having a first and second interconnected sets of loudspeaker and microphone, such as a full-duplex intercom or speakerphones at each end of a telephone call, not only can the superimposed signal be difficult to understand, but pickup by the second set's microphone of the superimposed signal can lead to oscillation having form of a loud squeal.

Audio echo cancellation is typically done by tapping a speaker drive signal, and delaying and filtering that signal according to a transfer function computed as a best match of a path from loudspeaker to microphone to form a delayed speaker signal, then subtracting this electronically delayed speaker signal from the microphone signal to cancel that portion of the microphone signal that represents audio from the loudspeaker.

The transfer function is not always a perfect match for real echo in a real-world installation. Whenever the transfer function is not perfectly matched, some residual, uncancelled, echo remains in the microphone signal. For example, a prototype speakerphone or cellphone may be analyzed in anechoic chamber to determine a transfer function from its loudspeaker to its microphone, and production phones may then be configured to subtract electronically delayed speaker signals from their microphone signal to improve the microphone signal. While such a device will cancel some echo, such as echoes due to sound paths within the device itself, echoes due to reflection of loudspeaker sounds off room walls and into the microphone will not be cancelled because they were not present when the transfer function was determined are therefore not represented the transfer function; these echoes due to reflection of sounds will remain in the microphone signal as a residual echo.

SUMMARY

In an embodiment, an echo canceller includes a fast Fourier transform (FFT) unit to provide a frequency domain representation (FD) of an input. A multiband adaptive filter receives the FD of the input and provides an FD filter output, the adaptive filter is a finite input response (FIR) digital filter. The canceller includes an FFT unit that provides an FD of a microphone signal, and a summer that adds the FD filter output to the FD of the microphone signal to provide an echo-canceller FD output. A feedback subsystem uses the echo-canceller FD output to adjust filter coefficients of at least a first, a second, and a third frequency band of the multiband adaptive filter to minimize uncancelled output in the echo-canceller FD output. The feedback subsystem is configured to adjust the filter coefficients of the second frequency band of the adaptive filter according to uncancelled output in the first, second, and third frequency bands of the echo-canceller FD output.

In another embodiment, a method of cancelling echo includes receiving an input into a fast Fourier transform (FFT) unit to provide a frequency domain representation (FD) of the input, and filtering the FD of the input with a multiband finite impulse response adaptive digital filter adapted to provide an FD filter output. The adaptive filter has a digital delay line that receives the FD of the input signal and provides multiple taps of delay, multipliers configured to scale magnitudes of multiple taps of delay, and a summer configured to sum outputs of the multipliers. The method includes receiving a microphone signal into an FFT unit adapted to provide an FD of the microphone signal; summing the FD filter output and the FD of the microphone input signal to provide an echo-canceller FD output, and adjusting filter coefficients of at least a first, a second, and a third frequency band of the multiband adaptive filter to minimize uncancelled output in the echo-canceller FD output. Adjusting the filter coefficients of the second frequency band of the adaptive filter is performed according to uncancelled output in a first and third frequency band in addition to uncancelled output in the second frequency band of the echo-canceller FD output.

DETAILED DESCRIPTION OF THE EMBODIMENTS

Figure 1:
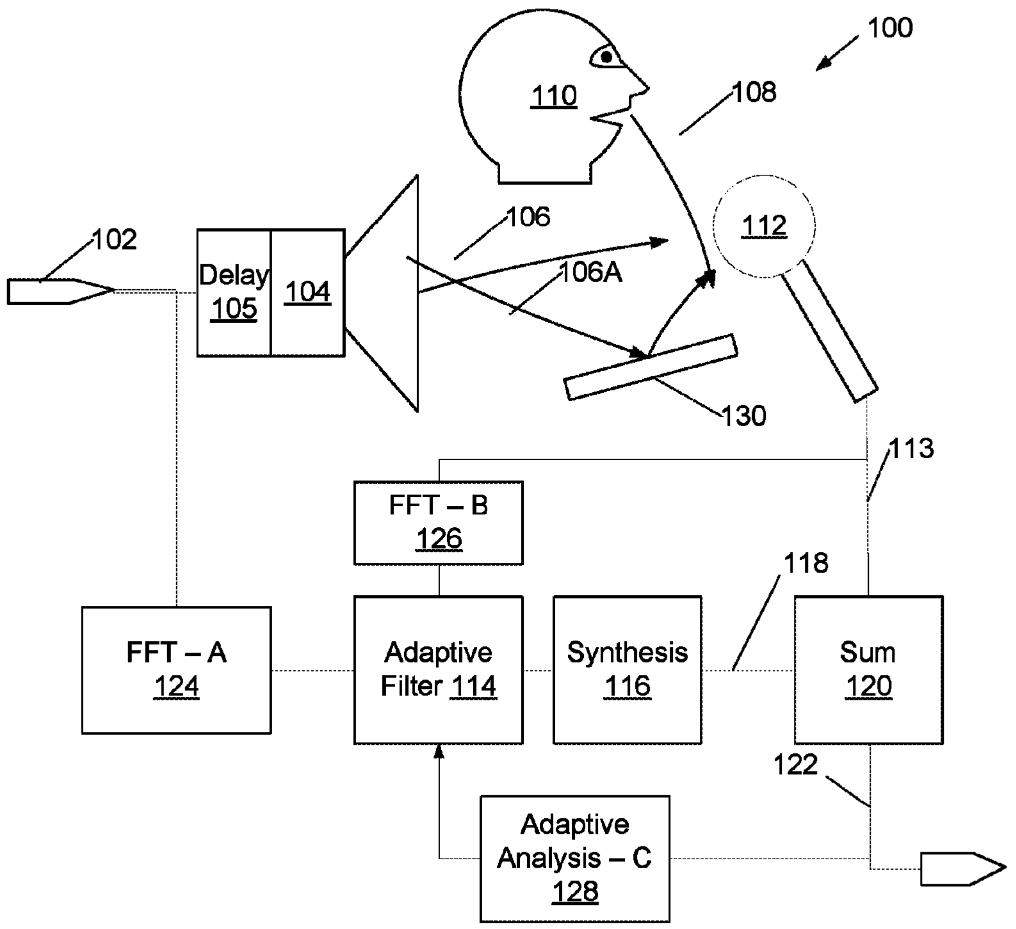
FIG. 1 is a block diagram illustrating an echo-cancellation subsystem.

An audio echo-cancellation subsystem 100 is illustrated in FIG. 1. This subsystem has a digital audio input 102 coupled to a loudspeaker driver 104, producing sound; in some embodiments audio input 102 drives loudspeaker 104 through a delay 105 allowing compensation for inherent delays in other portions of subsystem 100. Sound 106 from loudspeaker 104, together with sound 108 from a human speaker 110 or other sources, reaches a microphone 112, where the sound is converted to electronic audio signals and digitized as digital audio. Audio 113 from microphone 112 feeds through adaptive filter 114 and synthesis unit 116 to generate a correction signal 118, correction signal 118 is summed 120 to audio from the microphone 112 to provide an echo-cancelled output 122.

Sound loudspeaker 104 reaching microphone 112 is typically a combination of a direct path sound, illustrated as sound 106, plus one or more indirect paths, illustrated as sound 106A, that may include sounds reflected from a wall or other obstruction 130.

Successful echo cancelation requires correction signal 118 be equal in magnitude, and opposite in phase, to that portion of audio 113 from microphone 112 resulting from sound 106 from loudspeaker 104—which requires that adaptive filter 114 has filter coefficients that give it a transfer function that essentially models the path of loudspeaker sound 106.

In an embodiment, filter coefficients of adaptive filter 114 are derived by three analysis blocks, FFT A 124 analyzes the audio input 102 by breaking it into frequency subbands and subband-specific amplitudes and phases to determine when signals that might echo are present in input 102, thus determining when adaptive filter coefficients may be adjusted to reduce echo. FFT B 126 analyzes microphone audio 113 by breaking it into frequency subbands and subband-specific amplitudes and phases, and Adaptive Analysis C 128 analyzes residual audio in echo-cancelled output 122, again by breaking it into frequency subbands and subband-specific amplitudes and phases.

Figure 2:
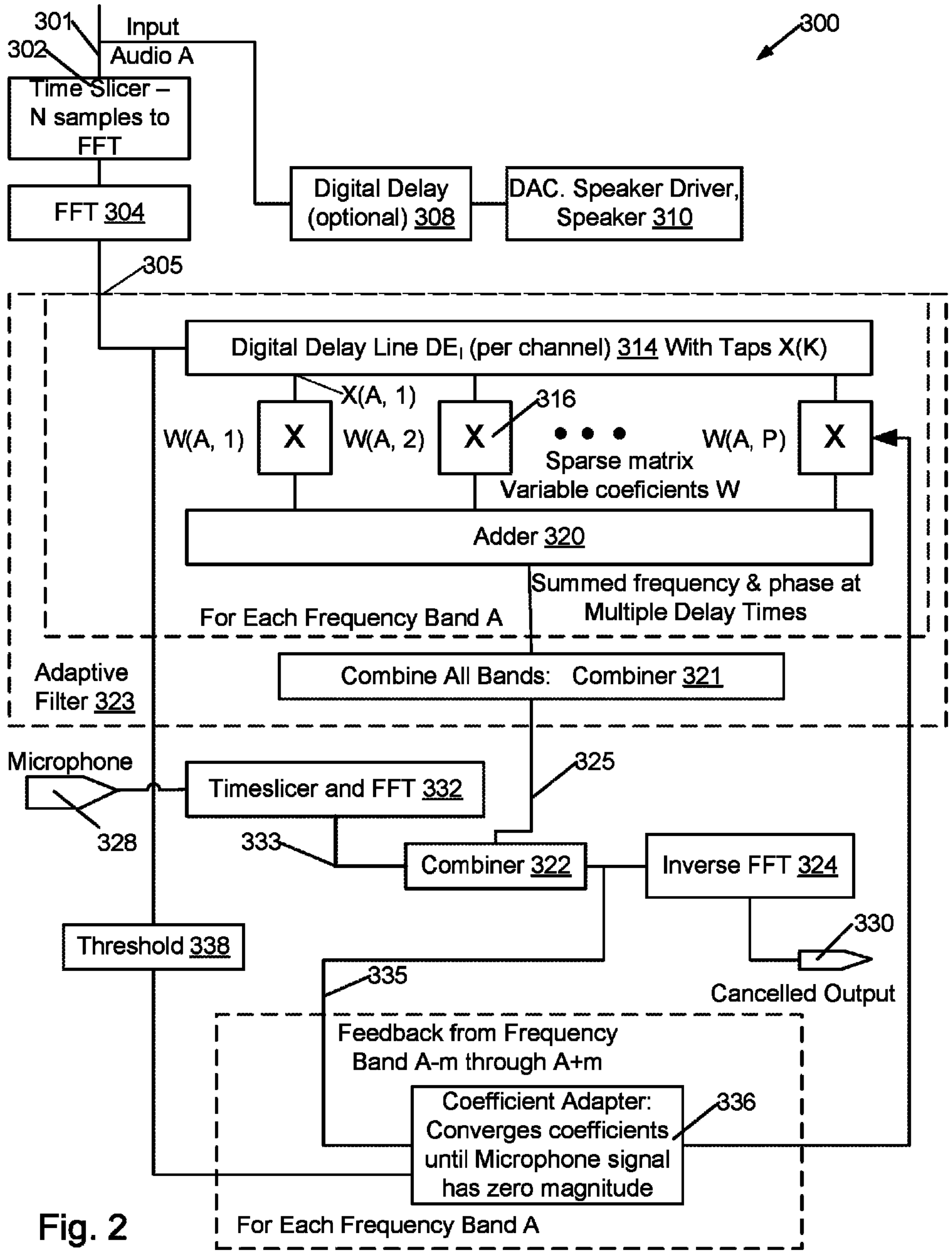
FIG. 2 is a detailed block diagram of a frequency-domain embodiment of the echo-cancellation subsystem.

In a particular intercom embodiment for use with speech, but not for music, digital audio input 102 is pulse-code-modulated (PCM) digital audio sampled at the 8000 samples per second often used in the telephone network, and received from a remote intercom or speakerphone unit (not shown) into delay 105, thence through a digital-to-analog converter (DAC) into loudspeaker driver 104. Digital audio 102 also passes into adaptive filter 114 (FIG. 1), 323 (FIG. 2). In an alternative embodiment, in order to provide better quality audio, the digital audio input is sampled at 16,000 samples per second. In an alternative embodiment configured for use while recording music, the digital audio input is sampled at the 44,100 sample per second rate of audio CD's.

In a typical embodiment, delay 105, adaptive filter 114, FFT A 124, FFT B 126, adaptive analysis 128, synthesis 116, and summer 120 blocks are implemented using firmware comprising machine readable instructions stored in a memory of a digital signal processor; upon execution of the firmware instructions the digital signal processor provides functional equivalents of these blocks using its data memory to provide interconnections between these blocks as well as storage required for these blocks.

In a frequency-domain embodiment 300 (FIG. 2), groups of N PCM samples of PCM digital audio input 301 are collected by time-slicer 302, and a fast-Fourier transform (FFT) 304 is performed on each timeslice. In order to best compensate for processing delays of the echo canceller, an optional digital delay 308 is performed, resulting PCM audio is converted to analog by a DAC 310 and provided to a speaker driver and loudspeaker.

Each FFT 304, as performed on a timeslice of digital audio input 301, provides a frequency-domain representation of audio within the timeslice having an amplitude and phase for each of several frequencies. In various embodiments, a timeslice ranges from 0.01 through 0.04 second.

Amplitude and phase at each frequency in each frequency band from FFT 304 is typically represented as a complex number, quantified amplitude and phase may be referenced herein as complex numbers. These complex numbers are further processed by an adaptive finite-impulse response (FIR) digital filter 323 including a multitap digital delay line 314 and multipliers 316 that multiply each amplitude at each frequency of the frequency band by a delay-strength-frequency band coefficient from a delay-strength-frequency matrix having variable coefficients W (I, K), where I is a particular frequency band, and K represents delay taps of the multitap delay line 314. In a particular embodiment, delay-strength-frequency matrix W (I, K) is a sparse matrix. In various embodiments, multitap delay line 314 provides from 0.02 to 0.3 seconds of maximum delay, K thus ranges from 0 for zero delay to P where P represents maximum delay. Products of each amplitude and phase tapped from multitap delay line 314 by each coefficient W (I, K) for each frequency band are summed by adder 320 to provide frequency domain audio, including frequency and phase, required to cancel audio in this timeslice. Coefficients W (I, K) represent a frequency-delay-magnitude matrix that is configured to give an initial setup for each embodiment of a system type, and adaptively configured to adjust for each individual installation to minimize residual echo. In a particular embodiment of an intercom, for example, and ignoring delays of circuitry such as FFT 332, certain coefficients M will tend to have a large absolute value at or near a delay K corresponding to a time required for sound to propagate from DAC and speaker 310 to microphone 328 within the intercom.

Delay line 314, coefficients W (I, K), and adder 320 are repeated for each frequency band. Combiner 321 recombines frequency-domain audio from adder 320 of each frequency band into a composite adaptive filter 323 output 325.

Meanwhile, microphone audio 328 is timesliced into similar timeslices to those used by timeslicer 302, and an FFT 332 is performed on each timeslice. The Fourier-transformed microphone audio 333 is added to adaptive filter 323 output 325 in combiner 322 and an inverse FFT 324 is performed to provide a cancelled output 330 suitable for transmission to other intercom units, cellular phones, public-address amplifiers, or other units of a system.

In order to adjust coefficients of the sparse delay-strength-frequency matrix, for each frequency band A, Fourier-transformed microphone audio 330 from frequency band A as well as first A+/−1, second A+/−2 and third A+/−3 adjacent bands are collected as feedback 335 to a coefficient adapter 336 that adjusts coefficients in the sparse delay-strength-frequency matrix M (A, K) to minimize cancelled output 335 long term.

In the embodiment of FIG. 2, audio is effectively processed through a multiband adaptive filter 323, processing real-time audio in each frequency band separately, and having a sparse-matrix of delay-strength coefficients W (A, K) for each frequency band A. Output of the adaptive filter is summed with microphone data to provide cancelled audio output, and cancelled audio output is observed to adapt the sparse matrix delay-strength-frequency band coefficients.

In the embodiment of FIG. 2, signal components in microphone signal 113 (FIG. 1) due to sound 106, 106A vary with each system for internal sound propagation, and each installation for external sound propagation. Further, in the case of an intercom, these components may vary further with daily conditions such as opening and closing of doors and parked cars located near the intercom, as well as presence or absence of sound-absorbing objects like people and animals. The extent to which echoes due to these components are cancelled is strongly dependent on coefficients W (I, K) of the adaptive filter, in particular the delay-strength coefficients of the sparse delay-strength-frequency matrix. Adaptive Analysis C 128 (FIG. 1) or coefficient adapter 336 (FIG. 2) operates to adjust delay-strength-frequency band coefficients based on uncancelled, or residual, audio present in echo-cancelled output 122 and associated with sound in input audio 102, 301. Typically, these coefficients are adjusted only when there is audio input 102 of significant magnitude within that frequency band, as is determined by thresholding unit 338, and adjustments are made to reduce frequency components within that same frequency band at output 122, 330.

We note that such systems using single-band feedback typically have significant residual, or uncancelled, echo in output 122, 330, thus it is desirable to improve echo cancellation. We have found that improved cancellation is achieved by using feedback from not just a current frequency band A, but to include the adjacent frequency bands A−3, A−2, A−1, A+1, A+2, and I+3 in determining coefficient W (A, K) for current band A.

Figure 4:
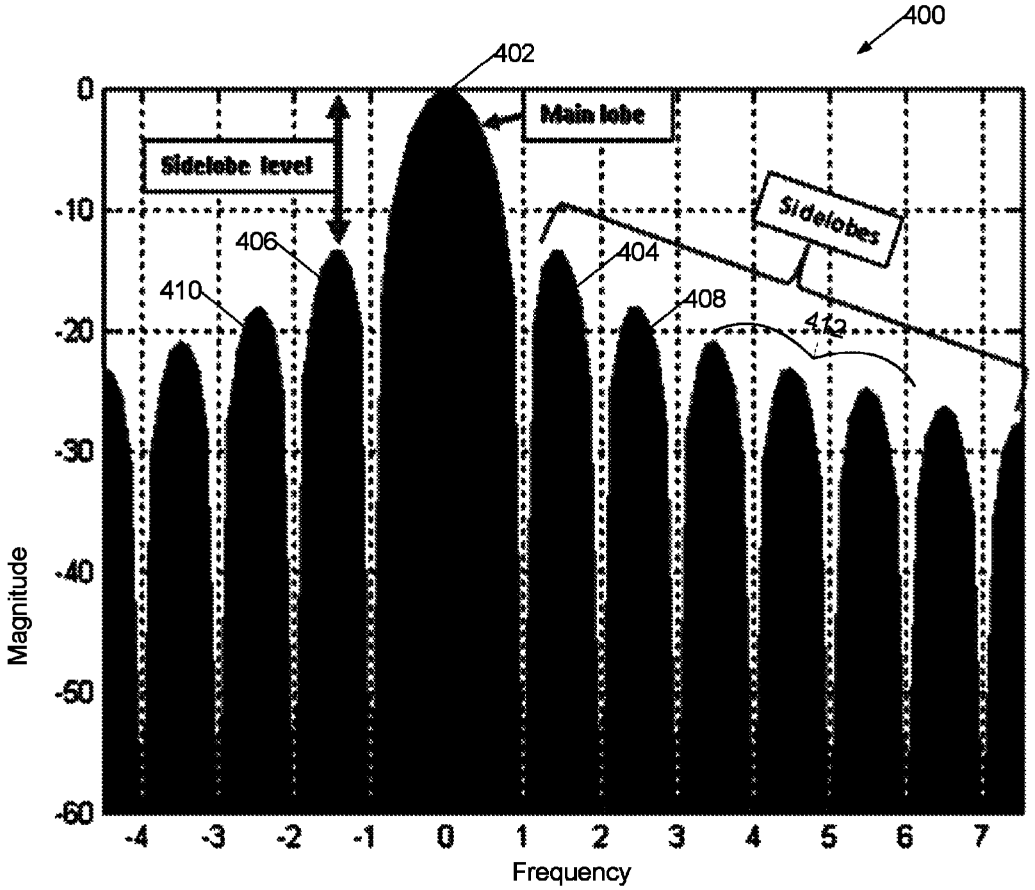
FIG. 4 is an illustration of in-band and out-of-band attenuation of a finite impulse response bandpass filter as used in the embodiment of FIG. 2.

We have observed that typical FFT, such as the impulse response filter 323 of FIG. 2, has frequency response 400 (FIG. 4) with a "main lobe" 402 and significant energy in first upper sidelobe 404, first lower sidelobe 406, second upper sidelobe 408, and second lower sidelobe 410. Additional sidelobes 412 exist, however they are typically significantly more attenuated than the first 404 and second 408 upper and first 406 and second 410 lower sidelobes. Similarly, FFT operations 304, 332 also have significant sidelobes. We have found that these sidelobes contribute to residual echo.

We have found that, by considering magnitude of not just output within the frequency band A, but in at least adjacent frequency bands A−1 and A+1 to frequency band A, when adjusting sparse delay-strength-frequency matrix coefficients of frequency band A, we can get improved echo cancellation. In some embodiments, we consider not just the first adjacent frequency band, but a second adjacent, or even first, second, and third adjacent frequency bands. In a particular embodiment, we consider first and second adjacent frequency bands A−2, A−1, A, A+1 and A+2 while adjusting coefficients for a channel band A. For this reason, in the embodiment of FIG. 2, feedback sub-banded output 335 used in adjusting sparse delay-strength-frequency coefficients for a particular frequency subband A of delay line 314 and adder 320 includes at least magnitude information for that subband A, the next adjacent upper subband A+1, and the next lower subband A−1. Since there are a finite number of frequency subbands, the lowest frequency subband B receives feedback from subband B and the next higher subband B+1, while the highest frequency subband C receives nonzero feedback from subband C and the next lower subband C−1. In a particular embodiment according to FIG. 2, using a sample rate of 16,000 samples per second, and a 0.02 second FFT frame width, 320 frequency subbands bands are used. In alternative embodiments, 150 or more frequency subbands are used.

The adaptive filter of the echo-canceller is described as having a sparse delay-strength-frequency matrix of coefficients. We have found that when exact coefficients are determined for echo cancellation using an adaptive filter as herein described, some coefficients have significant, nonzero, values, and some coefficients are small. We replace coefficients that are less than a threshold value with zero to minimize the number of multiplications required to implement the adaptive filter. In a particular embodiment, the threshold value is dynamically determined to maintain the number of multiplications below a limit determined by available processing power of the digital signal processor on which the system is implemented.

Figure 3:
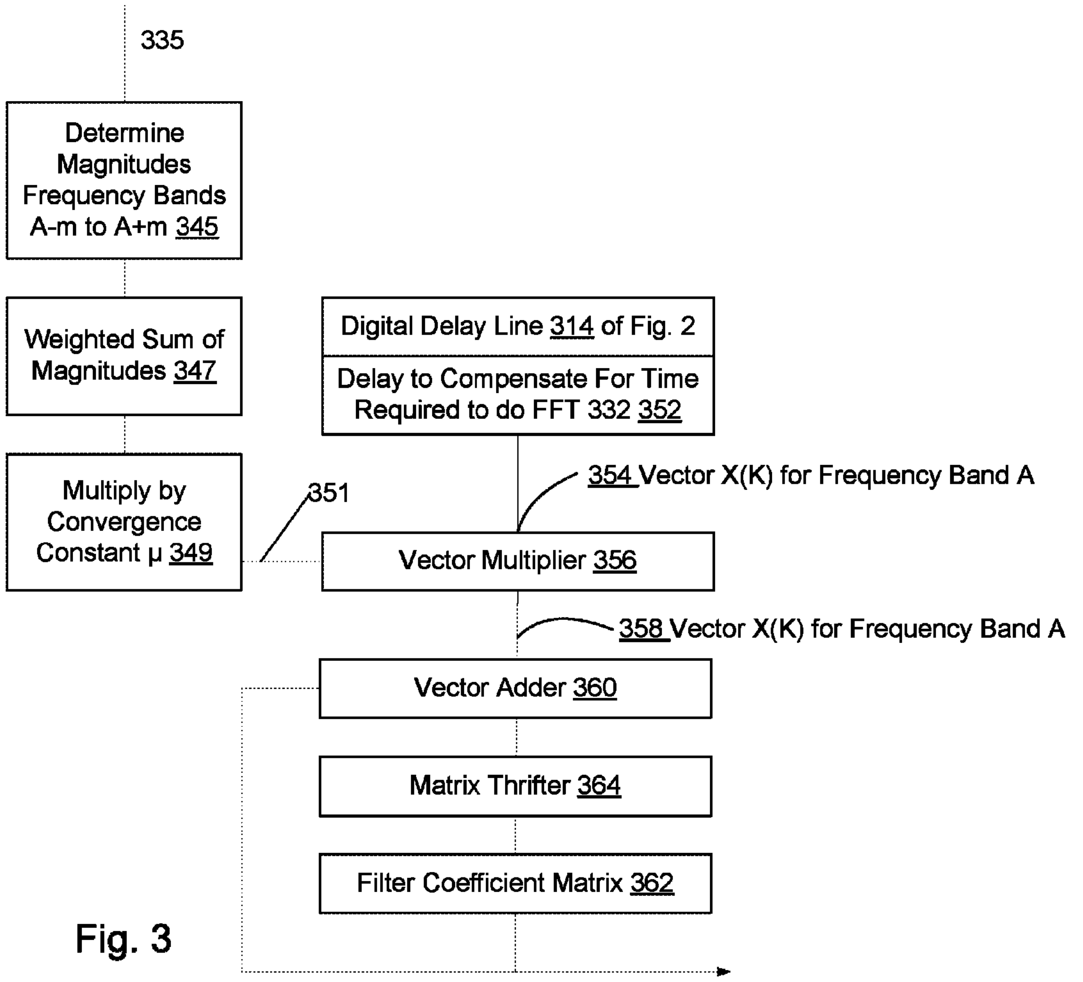
FIG. 3 describes the normalized least mean squared (NMLS) method used by the coefficient adapter 336 of FIG. 2 to adjust coefficients W (I, K) of the sparse matrix of frequency-delay-magnitude coefficients of adaptive filter 323.

Optimization of adaptive filter coefficients W(I,K) is performed by coefficient adapter 336 using the normalized least mean squares method (NLMS) as illustrated in FIG. 3. This method finds filter coefficients that produce the least mean square of an error signal, in these embodiments the error signal is the cancelled output 330 in the current band A and nearby bands A-m through A+m (for an integer m) as observed in timeslices when significant audio input 301 is present in the same frequency bands—no filter coefficients are updated during timeslices when audio input is in the same frequency band is absent. The filter coefficients W(A, K) are adjusted by a correction vector ΔW(A,K)(n) after execution of a timeslice n.

The combined frequency domain complex signals 335 for each timeslice for frequencies A−m, through A+m are first normalized by dividing them by an input power from the frequency domain input 305 for the same frequency bands in then an error E(n) is computed as a weighted sum of the frequency domain output signals 335 for frequencies A−m to A+m over time for frequency band A, this weighted sum is scaled by predetermined step size μ. μ is a predetermined step size less than one and is determined by experiment, small values of μ lead to prolonged convergence and large values of μ may lead to instability; the result is an error-dependent correction factor 351. A vector X is tapped and delayed 352 from the adaptive filter digital delay line 314 to give a vector X(K) 354, the delay 352 compensates for circuit and other delays such as delay of timeslicer and FFT block 332. Correction vector ΔW 358 is computed as a product 356 of the correction factor 351 times vector X (K), the correction vector 358 is then added by adder 360 to the filter coefficients W(A,K) as stored in a filter coefficient matrix register 362, from which they are provided to the adaptive filter multipliers 316. Sums from adder 360 are thrifted by a matrix thrifting unit 364 before being stored in filter coefficient matrix register 362.

Figure 5:
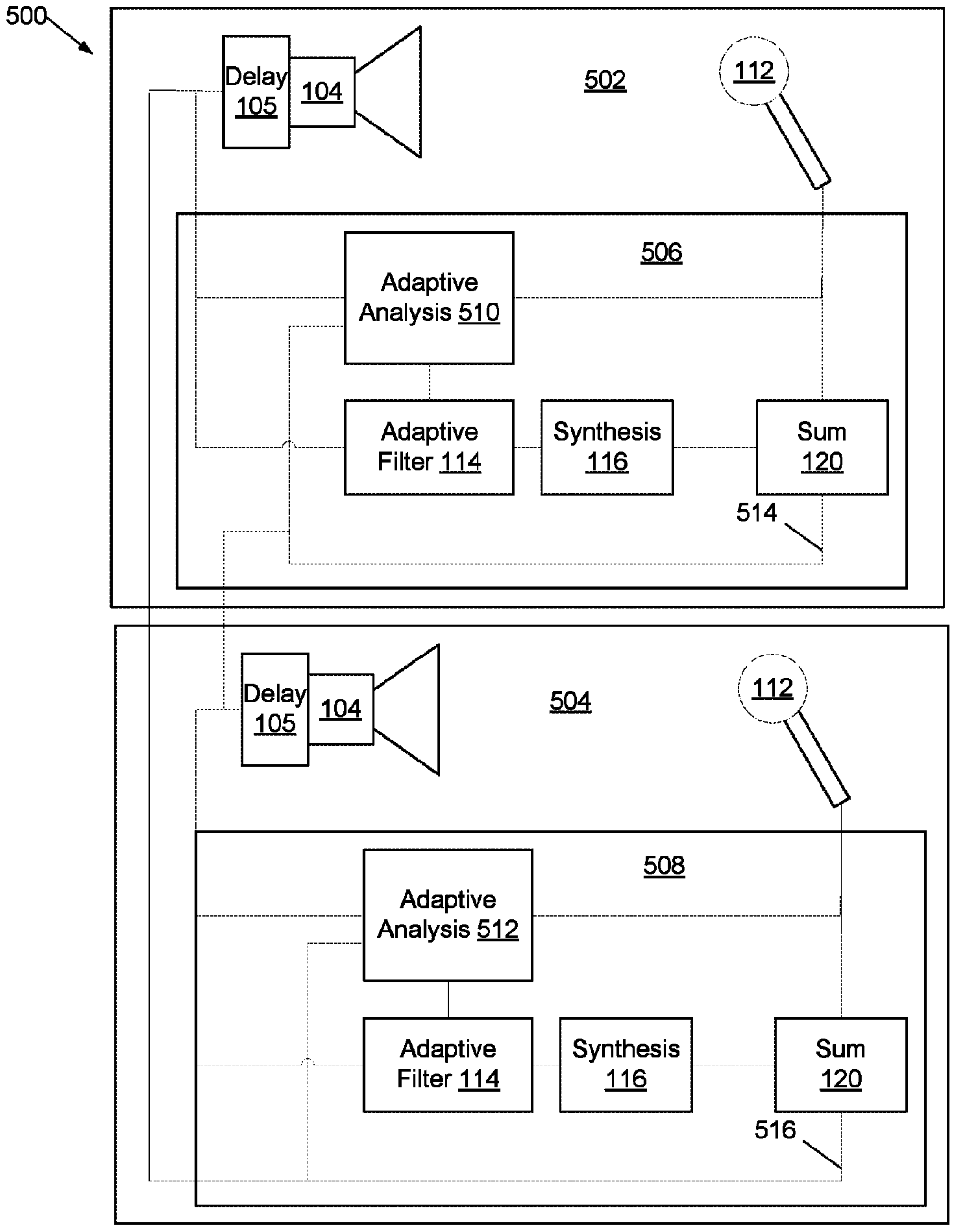
FIG. 5 is a block diagram of an intercom system embodying the herein-described echo canceller.

The echo canceller described with reference to FIGS. 1-4 may be used in an intercom system as illustrated in FIG. 5. The system 500 has a first intercom unit 502 in communication with a second intercom unit 504. Each unit 502, 504 has a speaker delay 105, loudspeaker and speaker driver 104, and microphone 112 as previously discussed with reference to FIG. 1, with an echo canceller 506, 508 coupled to cancel audio received by microphone 112 that originates at loudspeaker and speaker driver 104 at that intercom unit. Each echo canceller 506, 508 has a multiband adaptive filter 114, synthesis unit 116, and summer 120 as previously described, with a multiband adaptive analysis unit 510, 512 that considers magnitude of not just output within each frequency band A, but in at least the first adjacent frequency bands A−1 and A+1 to frequency band A, when adjusting sparse delay-strength-frequency matrix coefficients W(A,K) of frequency band A in multiband adaptive filter 114.

Echo-cancelled microphone output 514 from intercom unit 502 is coupled through an input terminal of second intercom 504 as input to speaker delay 105, loudspeaker and speaker driver 104, and multiband adaptive filter 114 of second intercom unit 504, and echo-cancelled microphone output 516 of intercom unit 504 is coupled through an input terminal of first intercom unit 502 as input to speaker delay 105, loudspeaker and speaker driver 104, and multiband adaptive filter 115 of first intercom unit 502, permitting communications between individuals speaking at each intercom unit.

Combinations

The various concepts and blocks herein described can be combined in several ways. Among these are:

An echo canceller designated A including a fast Fourier transform (FFT) unit to provide a frequency domain representation (FD) of an input signal; a multiband adaptive filter adapted to receive the FD of the input signal and provide an FD filter output, the adaptive filter comprising a digital delay line coupled to receive the FD of the input signal, multipliers configured to scale magnitudes of multiple delay taps from the delay line, and a summer configured to sum output of the multipliers; a FFT unit adapted to receive a microphone signal and provide an FD of the microphone signal; a summer coupled to receive the FD filter output and the FD of the microphone input signal and provide an echo-canceller FD output; and a feedback subsystem adapted to receive the echo-canceller FD output and to adjust filter coefficients of at least a first, a second, and a third frequency band of the multiband adaptive filter to minimize uncancelled output in the echo-canceller FD output; wherein the feedback subsystem is configured to adjust the filter coefficients of the second frequency band of the adaptive filter according to uncancelled output in the first, second, and third frequency bands of the echo-canceller FD output.

An echo canceller designated AA including the echo canceller designated A wherein filter coefficients of the adaptive filter are implemented as a sparse matrix of delay-strength-frequency coefficients.

An echo canceller designated AB including the echo canceller designated A or AA wherein there are at least 150 subbands.

An echo canceller designated AC including the echo canceller designated A, AA, or AB wherein the feedback subsystem uses a normalized least mean squares (NLMS) method to adjust filter coefficients of the multiband adaptive filter.

An echo canceller designated AD including the echo canceller designated A, AA, AB, or AC further comprising an inverse FFT unit adapted to receive the echo canceller FD output and provide an echo canceller output.

A station designated AE including a microphone adapted to receive sound and provide the microphone input signal to the summer of an echo canceller according to the echo canceller designated A, AA, AB, AC or AD and including a digital-audio input terminal coupled to the input signal of the multiband adaptive filter of the echo canceller; and an output coupled from the echo-canceller output.

A method designated B of cancelling echo including receiving an input signal into a fast Fourier transform (FFT) unit to provide a frequency domain representation (FD) of the input signal; filtering the FD of the input signal with a multiband adaptive filter adapted to provide an FD filter output, the adaptive filter comprising a digital delay line coupled to receive the FD of the input signal and provide multiple taps of delay, multipliers configured to scale magnitudes of multiple taps of delay, and a summer configured to sum outputs of the multipliers; receiving a microphone signal into an FFT unit adapted to provide an FD of the microphone signal; and Summing the FD filter output and the FD of the microphone input signal to provide an echo-canceller FD output; and adjusting filter coefficients of at least a first, a second, and a third frequency band of the multiband adaptive filter to minimize uncancelled output in the echo-canceller FD output; wherein adjusting the filter coefficients of the second frequency band of the adaptive filter is performed according to uncancelled output in a first and third frequency band of the echo-canceller FD output in addition to uncancelled output in the second frequency band of the echo-canceller FD output.

A method designated BA including the method designated B wherein the filter coefficients of the adaptive filter are implemented as a sparse matrix of delay-strength-frequency coefficients.

A method designated BB including the method designated B or BA wherein there are at least 150 subbands.

A method designated BC including the method designated B, BA, or BB wherein the feedback subsystem uses a normalized least mean squares (NLMS) method to adjust filter coefficients of the multiband adaptive filter.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An echo canceller comprising:

a fast Fourier transform (FFT) unit to provide a frequency domain representation (FD) of an input signal;

a multiband adaptive filter adapted to receive the FD of the input signal and provide an FD filter output, the adaptive filter comprising a digital delay line coupled to receive the FD of the input signal, multipliers configured to scale magnitudes of multiple delay taps of a plurality of frequency bands of delayed FD signal from the delay line, and a first summer configured to sum output of the multipliers;

a FFT unit adapted to receive a microphone signal and provide an FD of the microphone signal;

a second summer coupled to receive the FD filter output and the FD of the microphone input signal and provide an echo-canceller FD output; and a feedback subsystem adapted to receive the echo-canceller FD output and to adjust filter coefficients of the multipliers configured to scale delay taps associated with at least a first, a second, a third frequency band of the plurality of frequency bands of delayed FD signal from the delay line of the multiband adaptive filter to minimize uncancelled output in the echo-canceller FD output;

wherein the feedback subsystem is configured to adjust the filter coefficients of the multipliers configured to scale delay taps associated with the second frequency band of the adaptive filter according to uncancelled output in each of the first, second, and third frequency bands of the echo-canceller FD output, the coefficients being adjusted only when uncancelled output above a threshold is present in the second frequency band, the first and third frequency bands being adjacent to the second frequency band.

2. The echo canceller of claim 1 wherein filter coefficients of the adaptive filter are implemented as a sparse matrix of delay-strength-frequency coefficients.

3. The echo canceller of claim 1 wherein there are at least 150 frequency bands.

4. The echo canceller of claim 1 wherein the feedback subsystem uses a normalized least mean squares (NLMS) method to adjust filter coefficients of the multiband adaptive filter.

5. The echo canceller of claim 4 wherein the filter coefficients of the adaptive filter are implemented as a sparse matrix of delay-strength-frequency coefficients.

6. The echo canceller of claim 4 wherein there are at least 150 frequency bands.

7. The echo canceller of claim 4 further comprising an inverse FFT unit adapted to receive the echo canceller FD output and provide an echo canceller output.

8. A station comprising:

a microphone adapted to receive sound and provide the microphone input signal to the second summer of an echo canceller according to claim 1;

an input terminal coupled to the input signal of the multiband adaptive filter of the echo canceller; and an output coupled from the echo-canceller output.

9. A method of cancelling echo comprising:

receiving an input signal into a fast Fourier transform (FFT) unit to provide a frequency domain representation (FD) of the input signal;

filtering the FD of the input signal with a multiband adaptive filter adapted to provide an FD filter output, the adaptive filter comprising a digital delay line coupled to receive the FD of the input signal and provide multiple taps of delay, multipliers configured to scale magnitudes of multiple taps of delay, and a first summer configured to sum outputs of the multipliers;

receiving a microphone signal into an FFT unit adapted to provide an FD of the microphone signal;

summing, in a second summer, the FD filter output and the FD of the microphone input signal to provide an echo-canceller FD output; and adjusting filter coefficients of multipliers associated with at least a first, a second, and a third frequency band of the multiband adaptive filter to minimize uncancelled output in the echo-canceller FD output;

wherein adjusting the filter coefficients of the second frequency band of the adaptive filter is performed according to uncancelled output in a first and third frequency band of the echo-canceller FD output in addition to uncancelled output in the second frequency band of the echo-canceller FD output, and the adjusting of the filter coefficients of the second frequency band is performed only when there is uncancelled output in the second frequency band that exceeds a threshold;

and wherein the first and third frequency bands are adjacent to the second frequency band.

10. The method of claim 9 wherein the filter coefficients of the adaptive filter are implemented as a sparse matrix of delay-strength-frequency coefficients.

11. The method of claim 9 wherein there are at least 150 subbands.

12. The method of claim 9 wherein the feedback subsystem uses a normalized least mean squares (NLMS) method to adjust filter coefficients of the multiband adaptive filter.

* * * * *